May 12, 1970  G. E. CHILTON  3,511,369

CONVEYOR AND AUTOMATIC PARAMETER TESTER EMPLOYING SAME

Filed Feb. 14, 1968  3 Sheets-Sheet 1

INVENTOR.
GEORGE E. CHILTON
BY
Leonard H. King
ATTORNEY

May 12, 1970 G. E. CHILTON 3,511,369
CONVEYOR AND AUTOMATIC PARAMETER TESTER EMPLOYING SAME
Filed Feb. 14, 1968 3 Sheets-Sheet 2
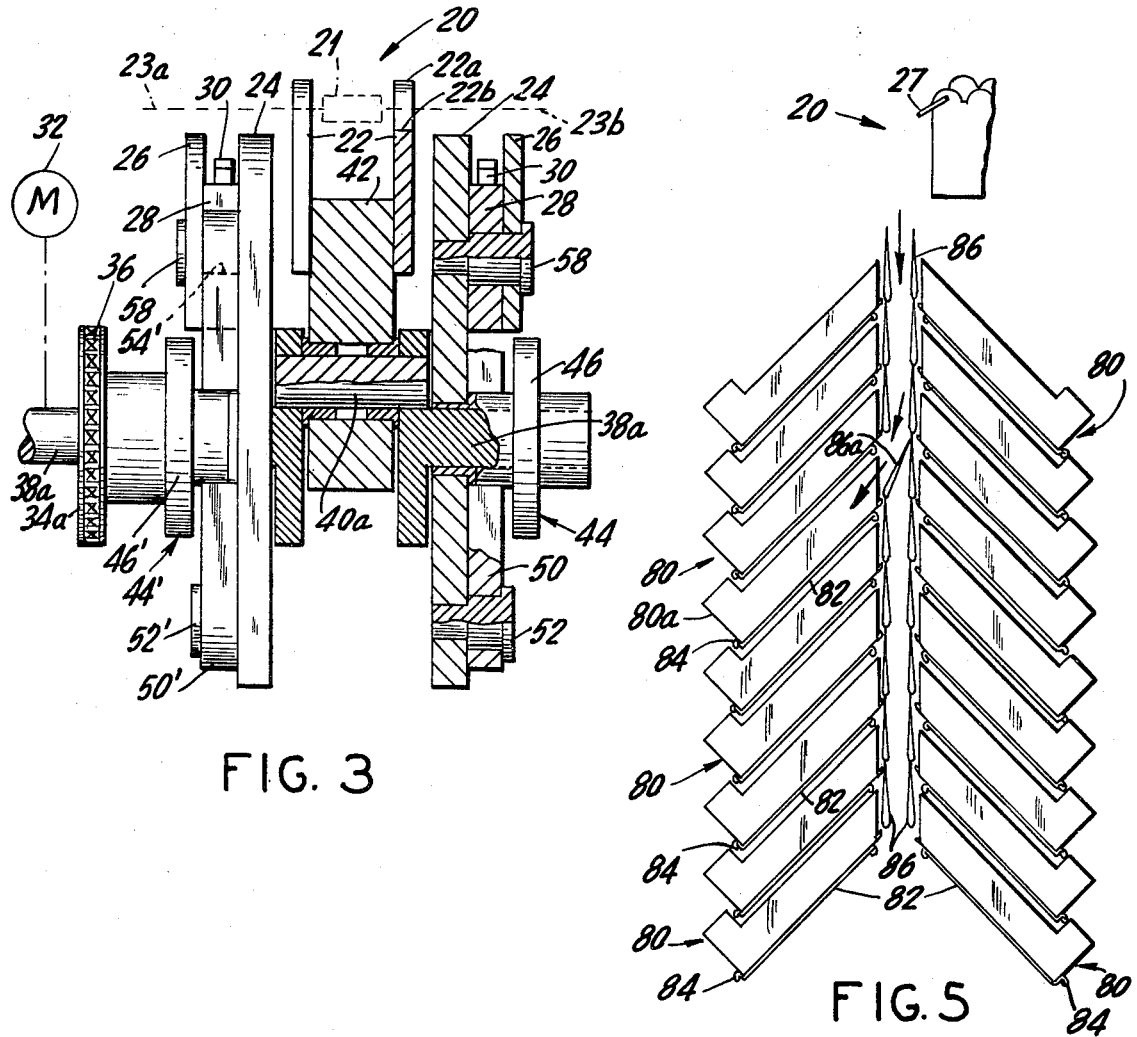
FIG. 3
FIG. 5
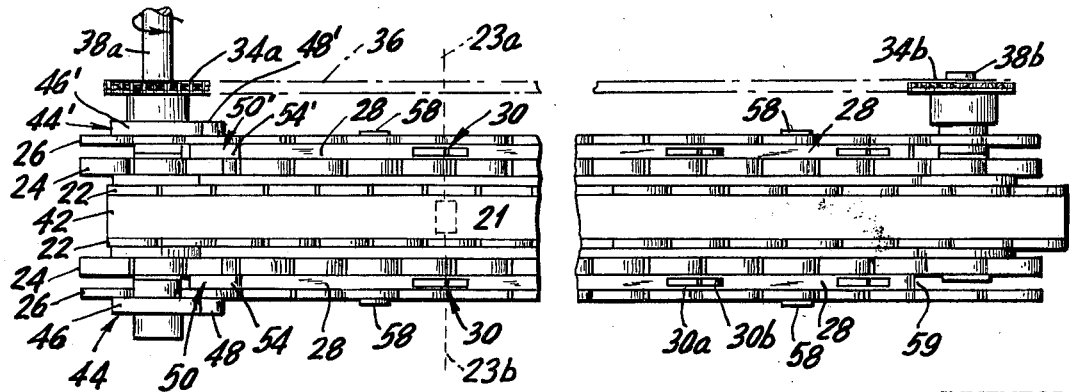
FIG. 4
INVENTOR.
GEORGE E. CHILTON
BY
Leonard H. King
ATTORNEY May 12, 1970  G. E. CHILTON  3,511,369
CONVEYOR AND AUTOMATIC PARAMETER TESTER EMPLOYING SAME
Filed Feb. 14, 1968  3 Sheets-Sheet 3

INVENTOR.
GEORGE E. CHILTON
BY
Leonard H. King
ATTORNEY

United States Patent Office 3,511,369
Patented May 12, 1970

3,511,369
CONVEYOR AND AUTOMATIC PARAMETER
TESTER EMPLOYING SAME
George E. Chilton, 144 Valley Road,
Haworth, N.J. 02503
Filed Feb. 14, 1968, Ser. No. 705,369
Int. Cl. B07c
U.S. Cl. 209—73                                    8 Claims

ABSTRACT OF THE DISCLOSURE

A recycling non-traveling transport and an automatic means for sequentially testing, or testing and sorting, articles as, for example, two terminal electrical components.

This invention relates generally to transport mechanisms and more particularly to a combination of transport mechanisms and automatic means for sequentially testing, or testing and sorting, a plurality of articles of manufacture.

BACKGROUND OF THE INVENTION

A major cost in the production of electronic components such as semi-conductor devices is the testing thereof for a number of parameters and the rejection of defective units and the sorting of operative units by their characteristics. In the case of semi-conductors such as diodes, these tests have to be run at several different temperatures. If a conventional connection means is used to carry the diode, the support has to be heated or cooled to the desired temperature, since the diode may have a mass in the order of one gram and the support may have a mass five hundred times as much. It will be appreciated that a substantial part of the testing time will be the time of bringing this large mass up to equilibrium at the desired testing temperature.

The apparatus of this invention avoids the use of a carry or transport mechanism which must be cycled through a variety of temperatures and conditions.

Although the present invention is particularly well adapted to the testing and sorting of small two terminal electronic components such as semiconductor diodes and will be so described hereinafter by way of example, it will be appreciated that the basic concept is not limited thereto. Other electronic components, for example, resistors, capacitors, etc., having a substantially similar external, physical configuration and requiring one or more tests in order to determine its particular characteristics, may also be tested and sorted by the present invention.

The apparatus to be described hereinafter provides means for continuously and incrementally advancing individual diodes through a plurality of successive test stations having different environments. A memory system may also be provided whereby, based on either single or multiple tests, the components are automatically removed from the advancing means, sorted according to test results, and deposited in bins without additional handling. A readout may be included in the present invention permitting continuous determination of production rates for each parameter under test. This feature permits prompt variation of the processing conditions to increase the proportion of units having preferred parameters.

The conveyor system of the present invention is arranged to advance the components from test station to test station in a stepwise manner. However, the conveyor and component support means do not themselves change environment; only the tested component does. This feature is particularly useful, for example, where successive tests include say, voltage measures at, first, a high temperature, and then a low temperature immediately thereafter. Since only the component under test goes from one environment to another, the conveyor need not vary in temperature and the testing time cycle may be kept at an absolute minimum. That portion of the conveyor associated with any particular test station stays within that test station at all times and only the component is moved therethrough.

Accordingly, it is an object of the present invention to provide improved, automatic testing means for small electronic components.

Another object is to provide means for automatically sorting and storing the components based on the results of the tests given thereto.

A further object is to automatically test components and provide a continuing readout of test results.

An additional object is to provide an improved conveyor system for the handling of a plurality of parts.

It is another object to provide a plurality of storage bins having closure means responsive to different combinations of test results.

A still further object is to provide novel conveyor means, each portion of which remains in its own environment and yet which advances components under test from one environment to another.

These and other features, objects and advantages of the invention will, in part, be pointed out with particularity and will, in part, become obvious from the following more detailed description of the invention, taken in conjunction with the accompanying drawing, which forms an integral part thereof.

DESCRIPTION OF THE DRAWING

In the various figures of the drawing like reference characters designate like parts.

FIG. 3 is an end elevational view partly broken away;

FIG. 4 is a plan view of the conveyor system;

FIG. 5 is a side elevational view of the hopper assembly; and

DESCRIPTION OF THE PREFERRED EMBODIMENT

Figure 2:
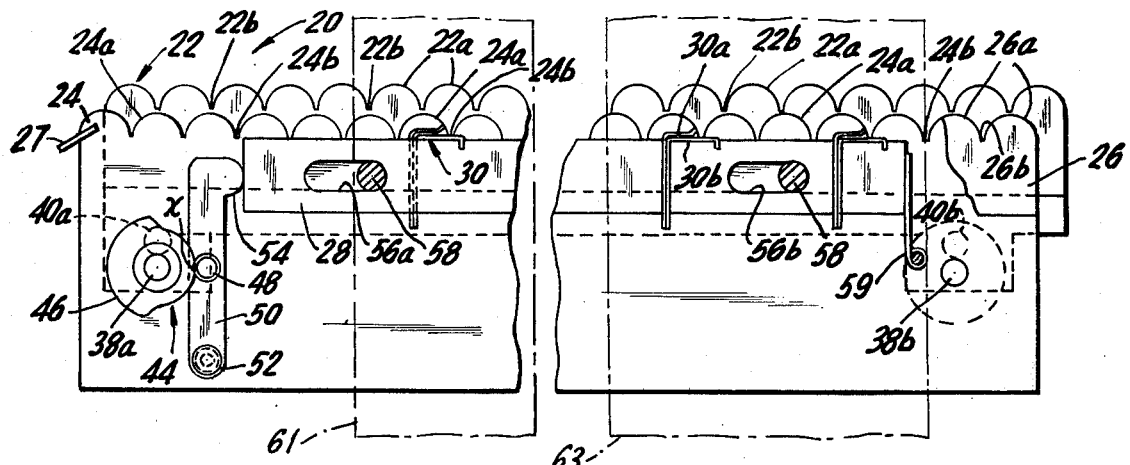
FIG. 2 is a fragmentary side elevation of the conveyor system of the present invention with a portion broken away.

The conveyor portion 20 of the present invention, as best seen in FIG. 2, FIG. 3 and FIG. 4, is comprised of a centrally located, elongated pair of carrier members 22 and pairs of inner and outer side frame members 24 and 26, respectively, positioned on the external side of each of the carriers 22, which carrier and frame members carry component 21. A slide member 28, having a plurality of contact fingers 30 extending above the top thereof, is movably disposed between each of the inner and outer frame members 24 and 26. Further, the upper edge surface of the carriers 22, as well as the inner and outer side frame members 24, 26, are provided with a plurality of semicircular ridges 22a, 24a and 26a, respectively. The ridges are spaced from each other by gaps 22b, 24b and 26b, respectively.

Positive drive means for the central carrier 22 is provided by motor 32. Sprockets 34a and 34b, in combination with chain 36 trained thereabout, drive crankshafts 38a and 38b (FIG. 4). The eccentric portion 40a and 40b of the crankshafts pass through a central spacer 42. On either side of the spacer there are secured the carrier members 22. The coaxial portions of the crankshaft are journaled in the stationary inner side frame members 24. Motor 32 is secured to one of the drive shafts (FIG. 3).

Mounted proximate each inner side frame members of the conveyor and secured to crankshaft 38a for rotation therewith are a pair of cams 44 and 44'. Lobes 46 and 46' of cams 44 and 44', respectively, are arranged to displace followers 48 and 48'. Levers 50 and 50', pivotally journaled at the lower end of each of the inner side frame members by means of pins 52 and 52', carry the cam followers. Levers 50 and 50' are provided at their upper ends with extensions 54 and 54', respectively, the extensions being in contact with the ends of slide member 28, each of which is provided with elongated apertures 56a and 56b. Pins 58 pass through the outer side frame members 26 and slides 28 and are secured in the inner side frame members 24. This construction permits relative movement of the slide members 28 and contact fingers 30 with respect to the carrier members 24 and 26.

Figure 6A:
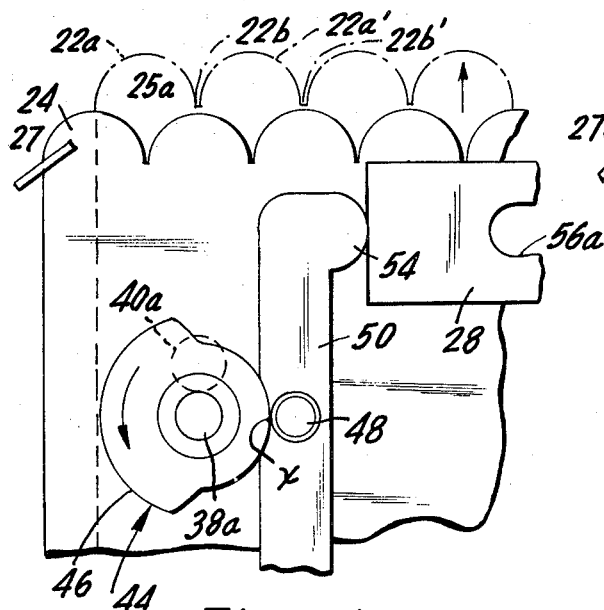
FIGS. 6A–6D are partial, schematic side views illustrating one complete cycle of the conveyor.
Figure 6B:
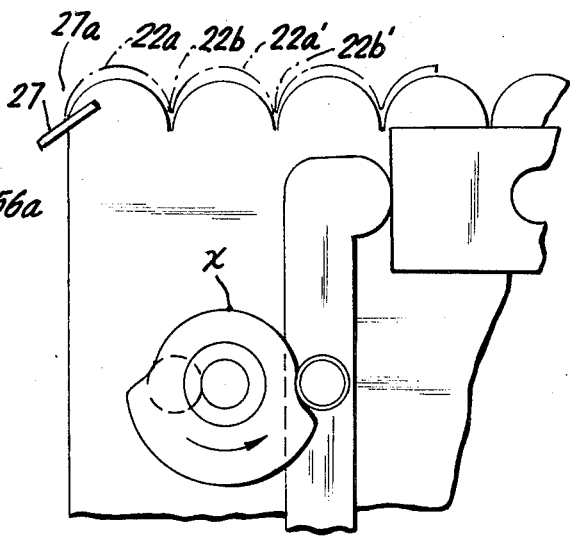

Cams 44 and 44' have identically oriented lobes which are in phase with one another. Since both cams are mounted on the same crankshaft they are driven by the motor in the same angular direction. Referring now to FIGS. 6A and 6D, the motion of the carrier members will now be described. For the purposes of this description, only one side of the conveyor is shown with the cam 44, the follower 48, the lever 50, the slide 28 and the fixed inner side frame 24 illustrated in solid lines. The movable carrier member 22 is shown in dot and dashed outline. For ease of illustration, the fixed outer frame member 26 has been omitted from FIG. 6 and in those cam positions where the carrier member 22 and the inner side frame 24 are directly superimposed over each other, the drawing is slightly exaggerated so that both types of lines may readily be seen.

By way of example, in FIG. 6A the cyclic starting point of typical adjacent ridges 22a and 22a' and gaps 22b and 22b' are shown at the 12 o'clock position. At this time eccentric 40a is also at the 12 o'clock position. One particular portion of the cam 44 (marked x) is in engagement with the follower 48 and the slide member 28 with the contact fingers 30 attached is at its extreme liftwardmost position. It should be noted that the selection of this particular starting point is arbitrary and for purposes of illustration only since the cycle is repetitive.

As the motor rotates the shaft 38a counterclockwise, the cam follower 48 will dwell on the low part of the cam 44 and slide member 28 will therefore remain in its original position because lever 50 is not displaced. Because it is eccentrically mounted on shaft 38a, the top of the carrier ridges 22a and 22a' will drop downwardly to the left to the level of the side frame ridges 25 and 25a'. It should be noted at this time that all the aforementioned ridges will be exactly coincidental with each other in FIG. 6B. However, for purposes of illustration only, the ridges are shown slightly displaced in the vertical direction. Point x on the cam has now moved to the 12 o'clock position (FIG. 6B). As will be explained hereinafter, the diodes 21, under test, are placed transversely across the carrier members with the outwardly extending conductive leads 23a and 23b disposed in one of the transversely spaced opposed pairs of gaps 22b. The motion of moving the carrier and eccentric from the 12 o'clock position to 9 o'clock position results in placement of the diode leads in the gaps of the fixed inner and outer side frame members 24 and 26 as well as on contact fingers 30.

Assuming that a component 21 has been tested and continuously advanced, then it will be appreciated that it will reach point 27a in FIG. 6B, and means must be provided for removing the component and directing it to a particular storage area. Such means are shown schematically as a discharge track 27 in FIG. 6B. A rail 27 is positioned between each pair of members 22 and 24. The space between the rails is sufficient to accommodate the component leads which drop out of gap 27a at some time between FIG. 6B and FIG. 6C. The component then falls by gravity to a hopper whose door is selectively opened in a manner to be described subsequently.

Figure 6C:
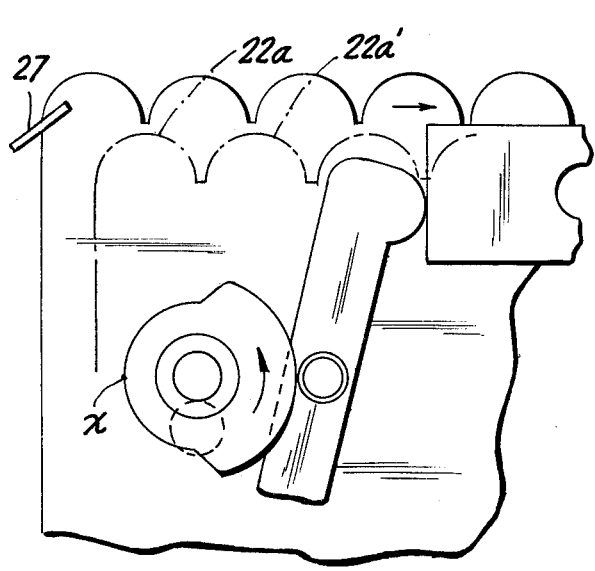
Figure 6D:
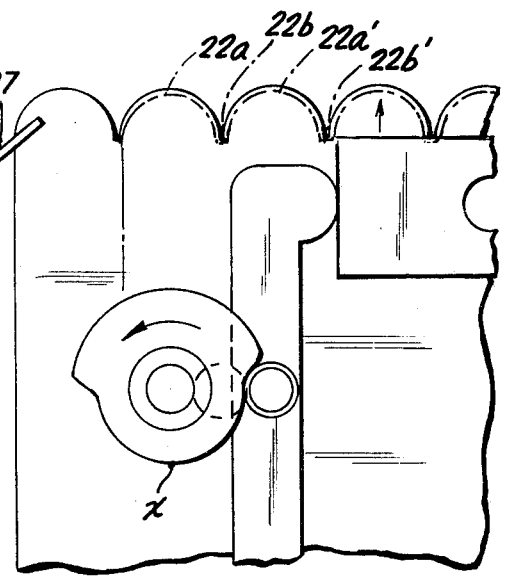

In FIG. 6C it will be seen that point x on the cam 44 has moved to the 9 o'clock position. The ridges of the carrier 22 have continued to drop and have moved back to the right to approach the original vertical starting point. Concurrently, because the follower 48 is riding on lobe 46, lever 50 will be pivoted clockwise about pin 52 as point x moves from 12 o'clock to 9 o'clock. Extension 54 will thereby displace slide member 28 to the right, causing the upper and lower spaced members 30a and 30b, respectively, of contact finger 30 to be disposed above and below the overhanging leads 23a and 23b of the diode 21 resting on gaps 24b and 26b of the inner and outer side frame members 24 and 26, respectively.

When point x on the cam 44 is at the 6 o'clock position (FIG. 6D), the carrier gaps, as typified by 22b, have moved upwardly and to the right. It should be noted that at this cam position, gap 22b is in the same position occupied by gap 22b' when point x of the cam was at 12 o'clock. Accordingly, gap 22b will pick the diode leads up off gaps 24b and 26b of the fixed frame members 24 and 26 and, as the cam and carrier 22 continue their upward and leftward movement (counterclockwise) the diode 1 will be progressively advanced stepwise to the letfhand end of the conveyor. With regard to the contact finger 30, since the follower 48 is on the low part of the cam when cam point x moves from 6 o'clock to 3 o'clock, the levers 50 and slide members 28 will be urged to the left by springs 59 (FIG. 2), one of which is on each side of the inner side frame members 24. The springs are fixed to the side frame members and bear against the right hand end of the slide members 28. Of course, other means could be employed to return the slides 28 and levers 50 to their starting point.

By way of summary, the diodes supporting gaps 22b of the carrier member 22 traverse a circular, counterclockwise path. While the gaps are in the lower semicircular portion of their path, they are out of contact with the diode ends 23. However, at this time the contact fingers 30 are in electrical connection with the diode ends so that a variety of tests may be performed thereon. In the upper, semicircular path of the gaps the support of the diode is reversed. The contact fingers 30 traverse a to-and-fro linear path while adjacent gaps in the carrier member traverse tangential circular paths. In this manner, at the point where one gap drops off a diode onto the side frame members 24 and 26 at the beginning of its cycle, the next adjacent gap to the left will pick up the diode at the end of its cycle to advance the diode stepwise towards the lefthand end of the conveyor.

Figure 1:
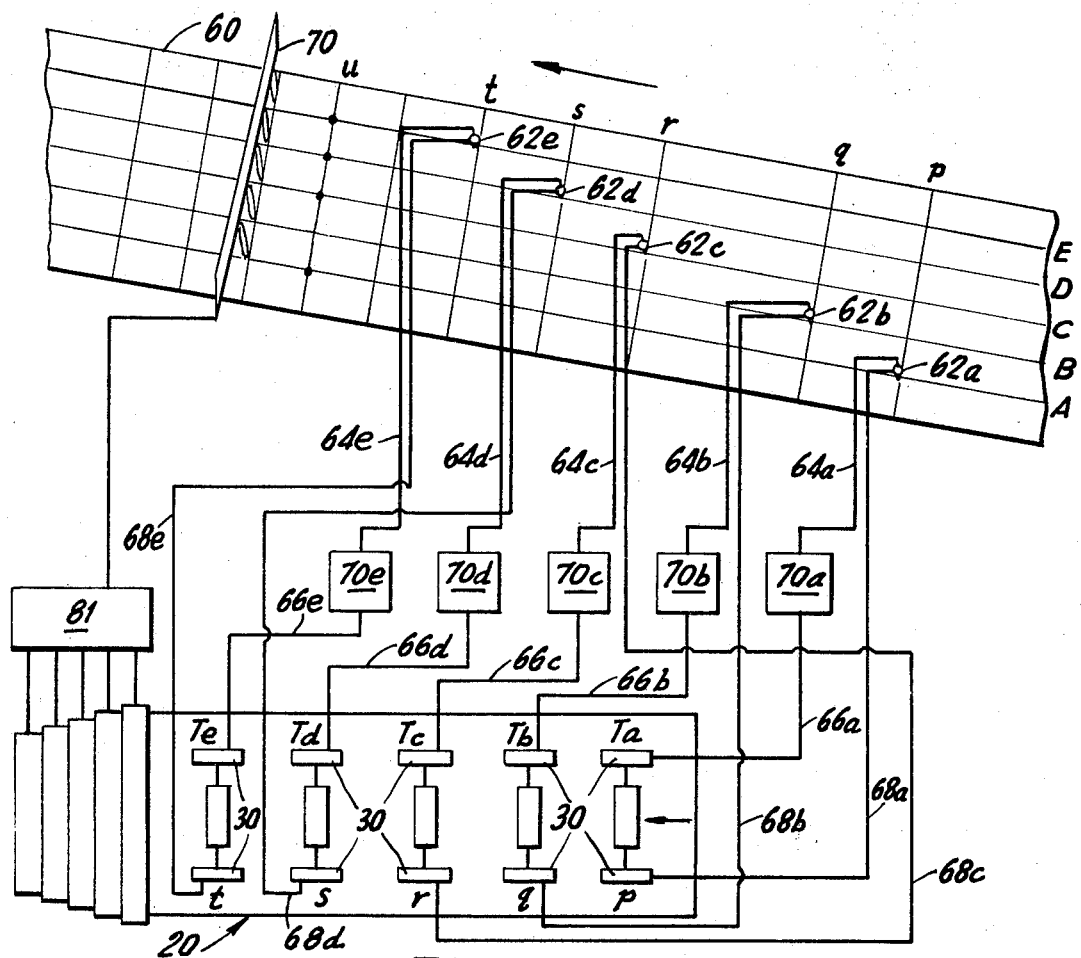
FIG. 1 is a schematic diagram of the system comprising the present invention.

Referring to FIG. 1, the operating procedure of the invention for testing, recording and sorting is now explained. The conveyor portion 20 of the invention is shown testing five diodes $p$, $q$, $r$, $s$ and $t$. Each of these diodes is moved by carriers as hereinbefore described to contact the sets of contact fingers 30. Each individual set of contact fingers corresponds to an individual test. In the example five tests are designed, $T_a$, $T_b$, $T_c$, $T_d$ and $T_e$. The carriers continuously move such that each diode is put consecutively through each test. For a system which also includes recording and sorting, for example, conductive leads 66a through 66e may connect each set of contact fingers with its own go-no-go comparator 70a, 70b, 70c, 70d and 70e. Leads 64a to 64e and 68a to 68e complete the circuit of the comparator and contact fingers and may further include a conventional solenoid actuated punch device or other marking means 62a and 62e in each circuit.

As an example, a paper tape 60, hereinafter termed a "memory tape" may be adapted to move past the marking devices in the direction shown. In the example with five tests desired, five test stations are made on the memory tape along five lines A, B, C, D, and E. As a diode is tested, the results are sent to the comparator. If the diode is within the limits preset in the comparator, the solenoid is activated to punch on the associated line.

For example, if diode $p$ is undergoing test $T_a$ and it should pass the test, solenoid 62a will punch line A along row P. At the same time diode $q$ is undergoing test $T_b$ and its results are punched on line B, row $q$. This continues for all the diodes in the conveyor. After a diode has undergone a specific test, the continuous movement of the carrier transfers that diode to the next successive test. In this case, diode $p$ will be next moved on to test $T_b$; diode $q$ will next be moved to test $T_c$; etc.

The "memory tape" also moves to the left such that when the diodes have advanced one test, the tape advances one row. When diode $p$ moves to test $T_b$ the row $p$ on the tape will be under the punch $62_b$.

In this manner the holes punched along a particular row indicate a set of characteristics of one corresponding diode subjected to all the tests set in to the device.

After a diode has undergone all the desired tests, the results of the tests on that diode may be examined by a binary coder 70. The coder reads the combination of punches and provides an appropriate signal to encoder 81 which will open a particular bin gate 86$a$ causing entry of that diode to bin 80$a$.

The tape 60 illustrated in FIG. 1 also shows the results of five consecutive tests on diode $u$. This diode was within the given range at test $T_a$ so that tape was punched on line A. The diode was outside the set range at test $T_b$ so no punch was recorded on line B. The diode $u$ "passed" the tests at stations $T_c$, $T_d$, $T_e$ so the tape is punched accordingly on lines C, D and E. Binary coder 70 will then read the combination ACDE and signal a particular bin to open which may be set to correspond to this combination.

FIG. 5 illustrates a plurality of bins 80 set up on either side of a centerline coincidental with the leftwardmost position of the end of conveyor 20. A plurality of plates 82 are set at an angle to the centerline, their lower outward ends having an upturned lip 84. The bins, which are nestingly received by plates 82, have side walls, a base wall and an outer end wall. The upper inner end of each bin proximate the centerline is open. Gates 86 are positioned in front of the open end of each bin, the gates being pivotally mounted at their lower ends. Upon a signal from the binary coder described hereinabove, the upper end of the corresponding gate pivots across the centerline (FIG. 5). Thus a diode dropping off the end of the carrier will be blocked from downward travel and will be directed into a particular bin. From a series of five tests, for example, a great variety of different parameters may be evolved. In this illustration, 18 bins are shown, nine on each side of the centerline. Each bin will therefore contain components within specific parameters.

One of the particular advantages of the present invention is shown in FIG. 2 where the transport mechanism is shown extending through two environmental chambers 61 and 63 which represent, for example, the heated and a cool chamber, respectively. Since the same portion of the transport mechanism is at all times within the confines of its respective chamber the transport mechanism reaches an equilibrium temperature. As the component is advanced into the chamber it is necessary only that its temperature be raised or lowered, as the case may be, to that of the chamber. Since the mass of the transport mechanism is manifold that of the component, this is accomplished almost instantaneously.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. An automatic testing apparatus for sequentially testing and sorting a plurality of articles comprising:
   (a) a carrier mechanism characterized by a movable carrier which advances the articles from one test station to the next in a stepwise manner, said carrier mechanism comprising:
   (1) a frame;
   (2) a pair of movable carrier members situated on the inside of the frame having upper portions shaped to retain a plurality of articles each spaced from the other and capable of cyclic movement with relation to said frame such that for part of the cycle said carrier mechanism is above the frame while for the remainder of the cycle said carrier mechanism is beneath said frame;
   (3) a pair of movable slides capable of longitudinal movement relative to said frame;
   (4) a plurality of clamp contacts situated on said slides wherein a pair of corresponding contacts from each said slide are connected to a test; and
   (5) drive means capable of moving said pair of carrier members in a cyclic pattern and said slides in a reciprocating longitudinal pattern, whereby during the period when said carrier mechanism is beneath the frame, said slides move longitudinally to clasp said contacts onto the ends of the articles subjecting them to tests, and during the period when said carrier mechanism is above said frame, the articles are advanced by said carrier mechanism to the next position while said slides are motionless;
   (b) a memory device which examines the results of each test and compares the results to a predetermined set of limiting values;
   (c) a recording instrument which keeps account of the results of said memory device for each article;
   (d) a plurality of storing compartments; and
   (e) a recording device which responds to said recording instrument and signals a particular one of said storing compartments to receive the article.

2. A device as in claim 1, wherein said memory device is a go-no-go comparator.

3. A device as in claim 1, wherein said recording instrument comprises:
   (a) a moving tape; and
   (b) a plurality of punch devices each associated with a specific test, wherein each punch device operates on a specific strip of said tape such that the results of a series of tests on one of said articles appears as a series of punched holes in single row.

4. A device as in claim 1, wherein said storage compartments consist of:
   (a) a plurality of plates set at a downward angle on either side of a centerline;
   (b) a plurality of storage bins situated one on each of the plates; and
   (c) a plurality of gates positioned on the upper end of the storage bins and pivotally mounted at its lower end, whereby a particular signal from the decoding device causes a particular gate to pivot across the center line opening the associated bin to receive the article.

5. A transport mechanism for conveying articles to a test position comprising:
   (a) a frame;
   (b) a pair of movable carrier members situated proximate the frame having its upper portion shaped to retain a plurality of articles each spaced from the other and capable of cyclic movement with relation to the frame such that for part of the cycle the carrier is above the frame while for the remainder of the cycle the carrier is beneath the frame;
   (c) a pair of movable slides capable of longitudinal movement relative to the frame;
   (d) a plurality of clamp contacts situated on the slides wherein a pair of corresponding contacts from each slide are connected to a test; and
   (e) drive means capable of moving the pairs of carrier members in a cyclic pattern and the slides in a reciprocating longitudinal pattern, whereby during the period when the carriers are beneath the frame the slides move longitudingly to clasp the contacts onto the ends of the articles subjecting them to tests, and during the period when the carriers are above the frame the articles are advanced by the carriers to the next position while the slide is motionless.

6. The apparatus of claim 5 in combination with at least one chamber through which said transport means extends including means for maintaining the temperature within the said chamber at other than ambient.

7. A carrier mechanism comprising:
  (a) a frame;
  (b) a pair of movable carrier members situated proximate the frame having its upper portion shaped to retain a plurality of articles each spaced from the other and capable of cyclic movement with relation to the frame such that for part of the cycle the carrier is above the frame while for the remainder of the cycle the carrier is beneath the frame; and
  (c) a plurality of clamp contacts capable of longitudinal movement relative to said frame wherein a pair of corresponding contacts are connected to a test.

8. The apparatus of claim 7 in combination with at least one chamber through which said transport means extends including means for maintaining the temperature within the said chamber at other than ambient.

References Cited

UNITED STATES PATENTS

| | | | |
|---|---|---|---|
| 3,032,191 | 5/1962 | Clukey | 209—81 X |
| 3,039,604 | 6/1962 | Bickell et al. | 209—81 X |
| 3,239,059 | 3/1966 | Cole et al. | 209—81 X |
| 3,389,787 | 6/1968 | Wilks | 209—81 X |
| 3,412,333 | 11/1968 | Frick et al. | 209—81 X |

ALLEN N. KNOWLES, Primary Examiner

U.S. Cl. X.R.

198—219; 209—74, 81